United States Patent Office 3,335,840
Patented Aug. 15, 1967

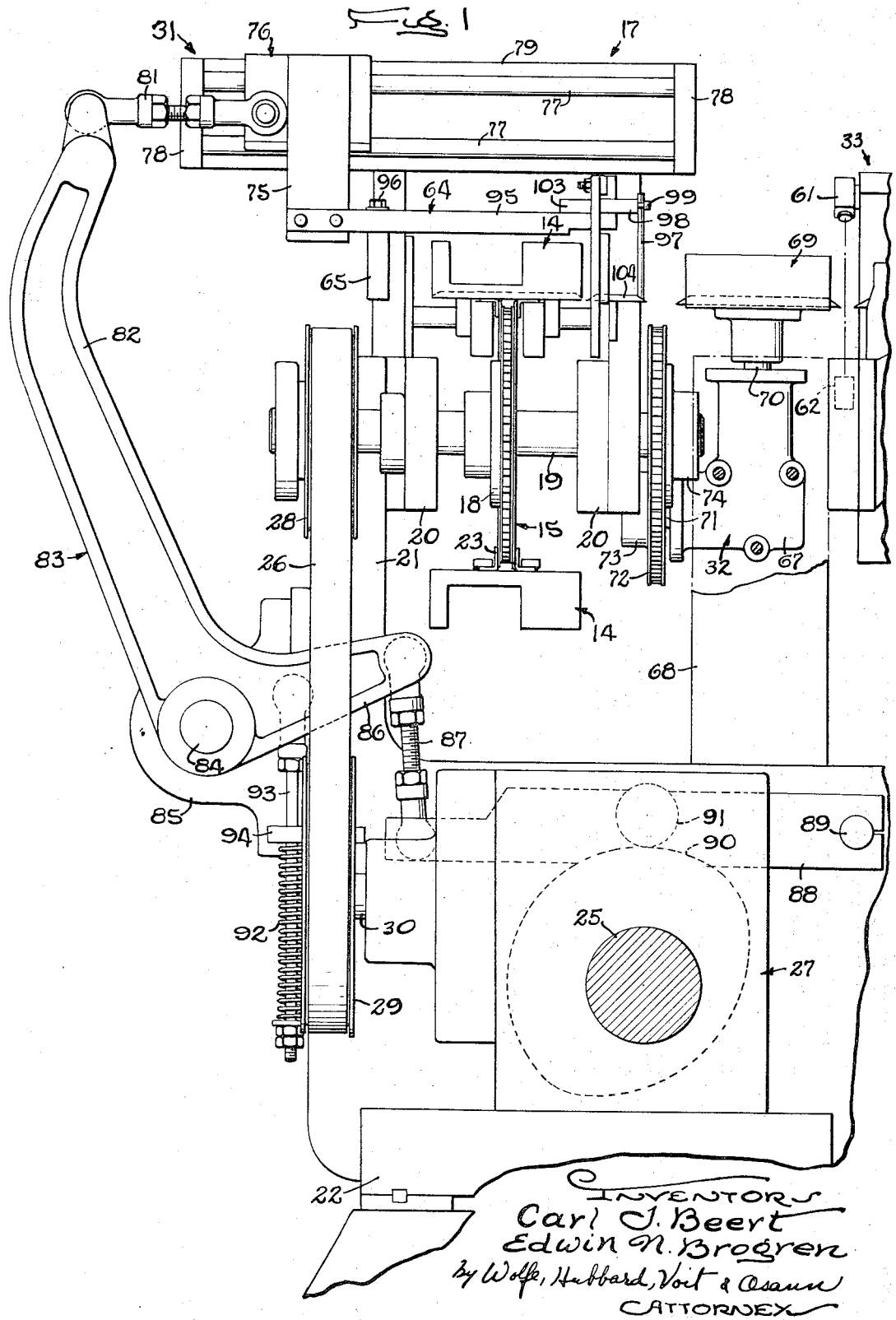

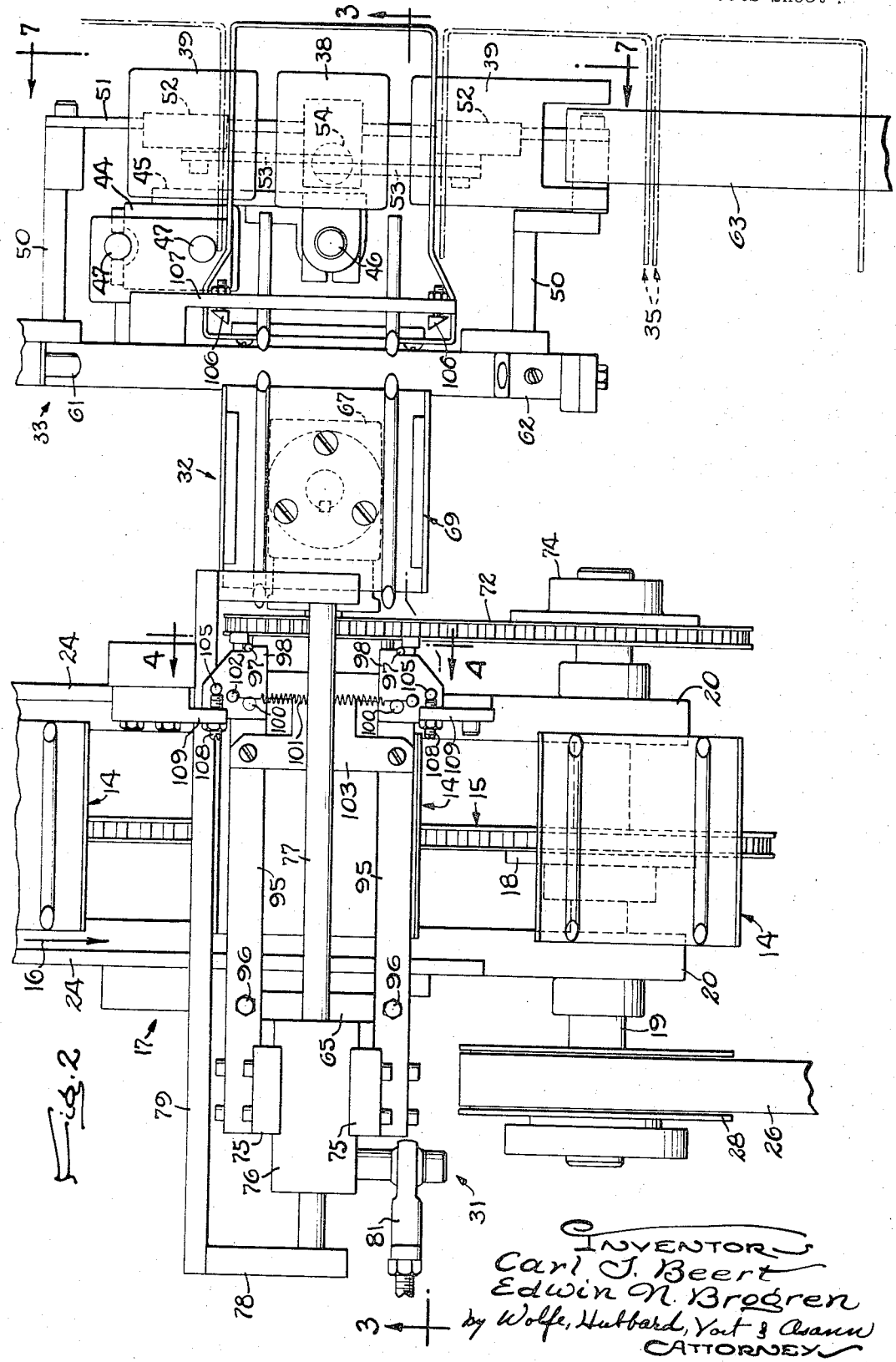

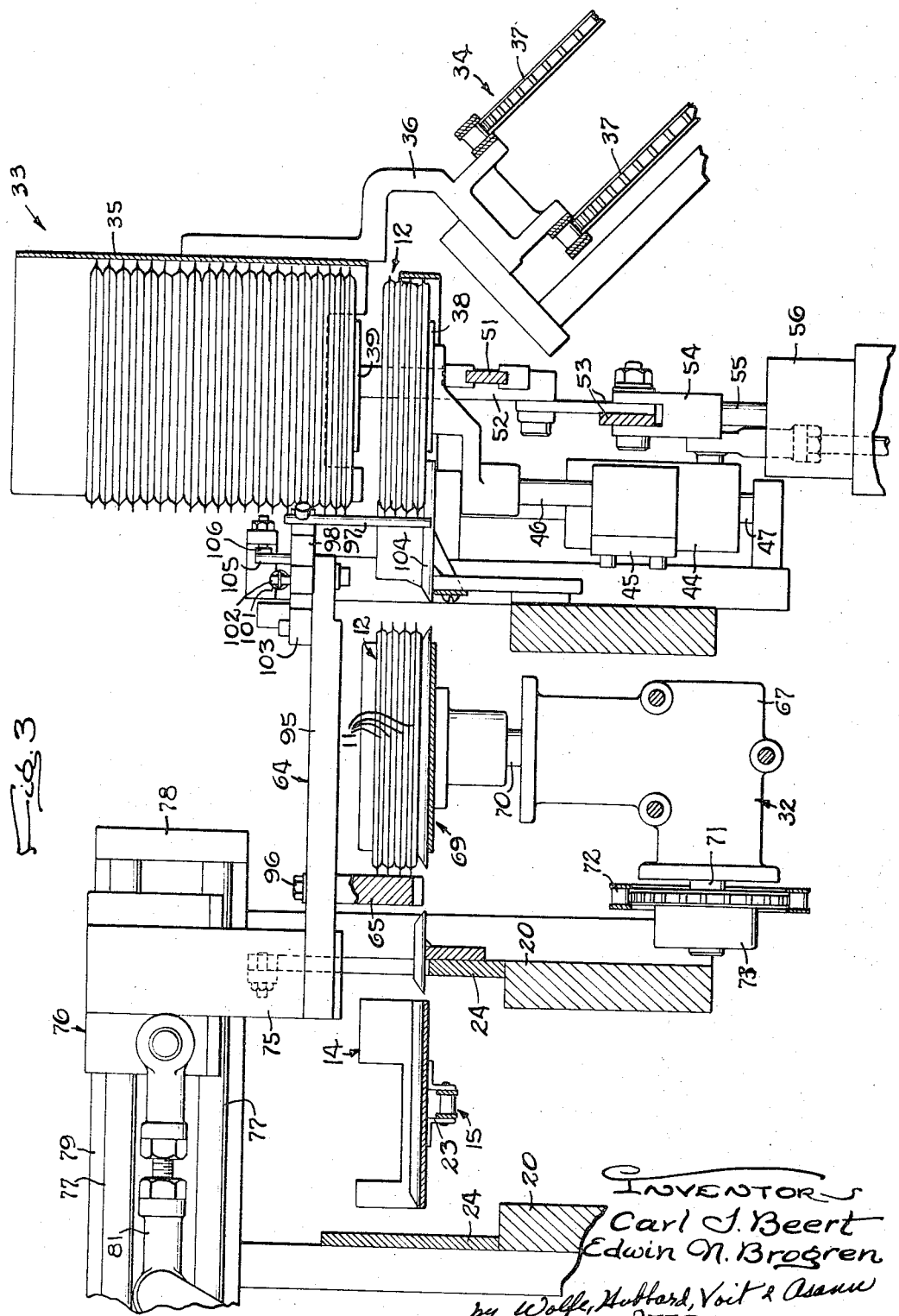

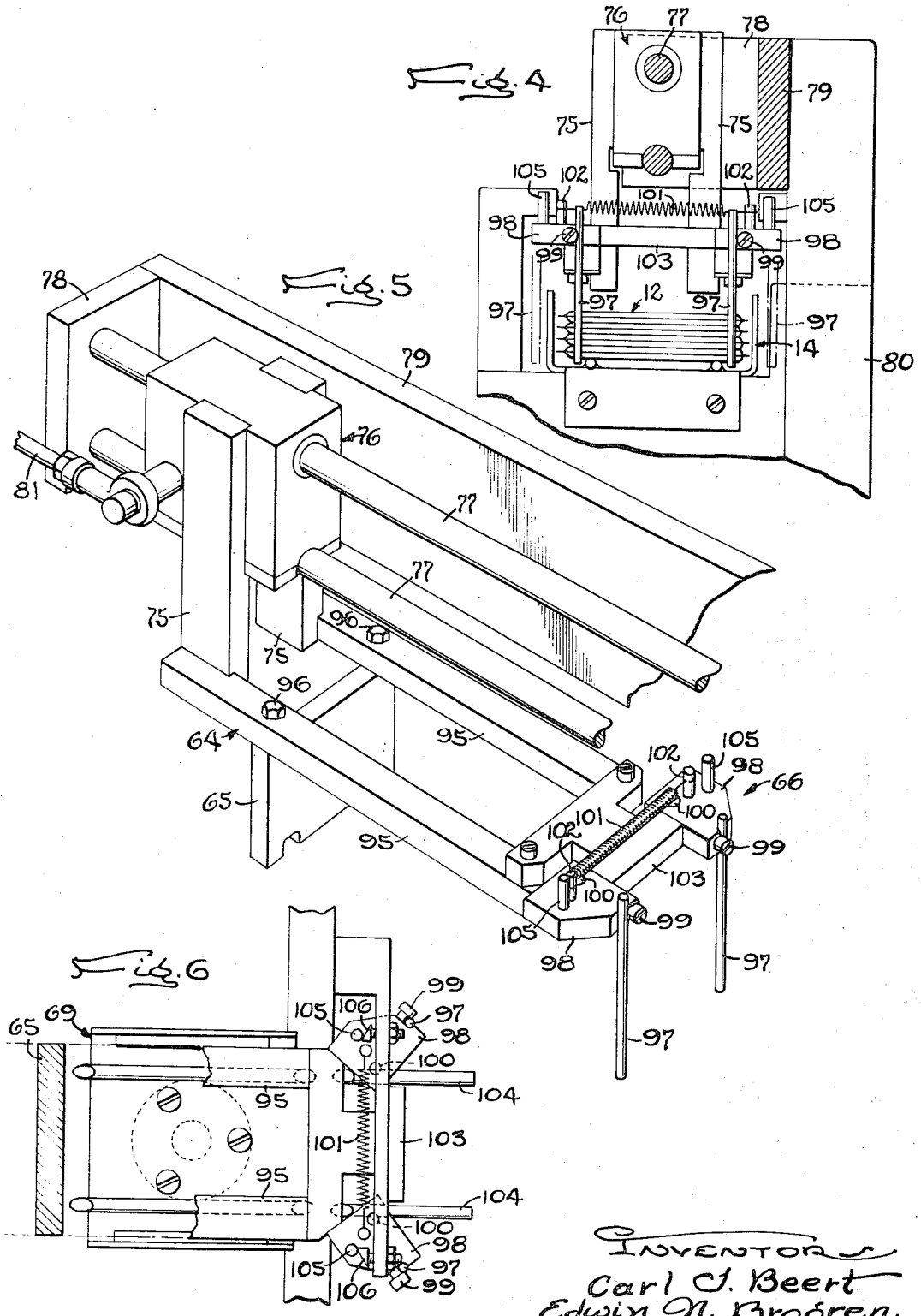

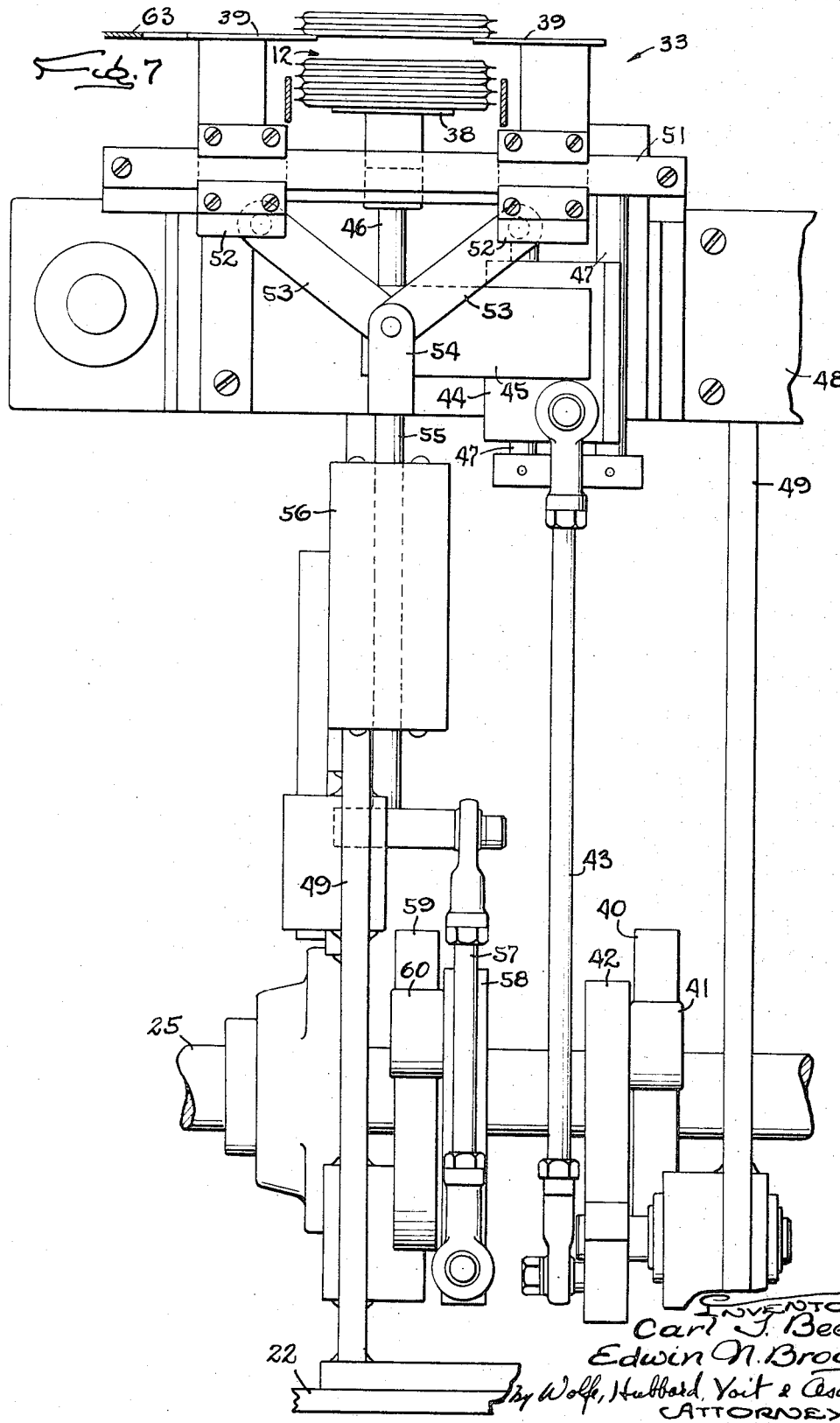

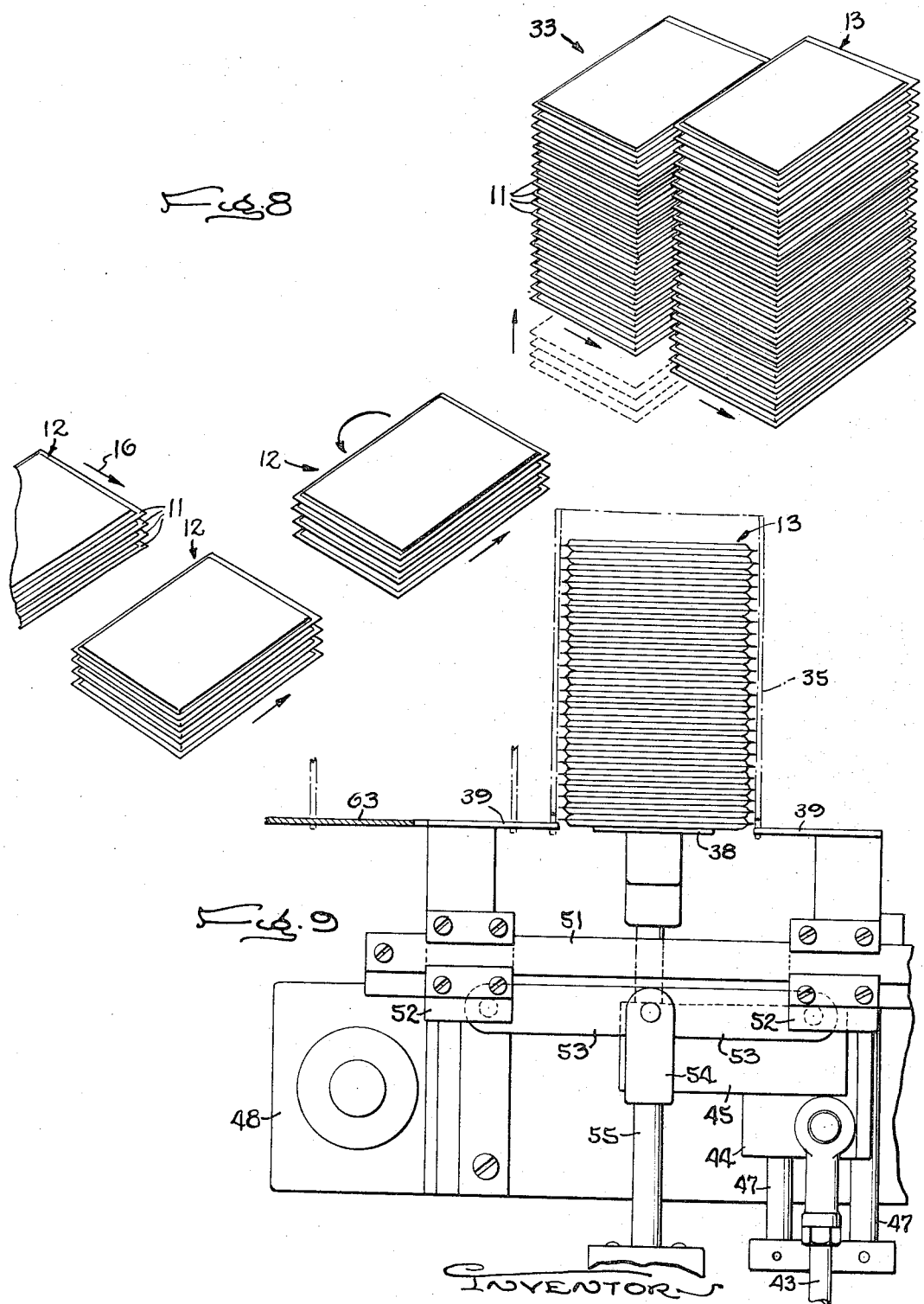

3,335,840
MACHINE FOR HANDLING A SERIES
OF ARTICLES
Carl J. Beert and Edwin N. Brogren, Rockford, Ill., assignors to Bartelt Engineering Company, Inc., Rockford, Ill., a corporation of Delaware
Filed Feb. 17, 1966, Ser. No. 528,311
10 Claims. (Cl. 198—24)

ABSTRACT OF THE DISCLOSURE

A transfer mechanism having a carrier movable back and forth between a conveyor and a turn-around and supporting a pusher operable to shove a group of packages from the conveyor and onto the turn-around on the forward stroke of the carrier. During the same stroke, a gate positioned forwardly of the pusher shoves the packages which previously have been delivered to the turn-around onto a second conveyor, and then is swung automatically to an inactive position during the return stroke of the carrier to by-pass the first group of packages resting on the turn-around.

Background of the invention

This invention relates to a machine for handling a series of articles to be packaged and, more particularly, relates to an automatic packaging machine in which the articles are stacks of packages advanced along a predetermined path to a discharge station after being filled and closed. In such a machine, the stacks of packages first are transferred from the discharge station to an operating device for the performance of an intermediate operation and then are transferred from the operating device to further stations for additional handling.

Summary of the invention

The primary object of the present invention is to provide in a machine of the above character a new and improved transfer mechanism of simplified and inexpensive construction and operable in timed relation with the advance of the packages along the path to transfer successive stacks of packages onto the operating device and, as an incident to the delivery of each stack of packages to the operating device, to transfer the preceding stack to the next station.

Another object is to provide a transfer mechanism having a carrier which shifts back and forth between the discharge station and the operating device and both delivers stacks of packages to and transfers packages from the operating device on a single forward stroke.

A more detailed object is to achieve the foregoing with a carrier having a pusher for transferring the stacks to the operating device, and a gate movable directly in response to the motion of the carrier between an active position for transferring the stacks from the operating device during the forward strokes of the carrier and an inactive position for by-passing stacks on the operating device during the return strokes of the carrier.

The invention also resides in the novel construction of the gate which is considerably simpler in construction and more trouble free in operation than previous devices used for related purposes.

Brief description of the drawings

FIGURE 1 is a fragmentary end view of a machine embodying the novel features of the present invention.

FIG. 2 is an enlarged fragmentary plan view of the machine shown in FIG. 1.

FIG. 3 is a fragmentary cross-section taken substantially along the line 3—3 of FIG. 2 with parts shown in moved positions.

FIG. 4 is a fragmentary cross-section taken substantially along the line 4—4 of FIG. 2.

FIG. 5 is a fragmentary perspective view of the transfer mechanism.

FIG. 6 is a fragmentary plan view of the transfer mechanism shown in FIG. 5 with parts being broken away and shown in moved positions.

FIG. 7 is a fragmentary cross-section taken substantially along the line 7—7 of FIG. 2.

FIG. 8 is a schematic perspective view illustrating the pertinent steps performed by the machine.

FIG. 9 is a fragmentary view similar to a portion of FIG. 7 with the parts in different positions.

Detailed description

As shown in the drawings for purposes of illustration, the invention is embodied in a machine, such as a high-speed packaging machine, for handling a series of articles in the form of envelope-type packages or bags 11 which, after being filled with a measured charge of product and sealed closed, are collected in small stacks 12 (FIG. 8) of four bags each and conveyed step-by-step along a predetermined path. During this movement, the small stacks are arranged so that the labeling and advertising indicia on the bags will be positioned properly when the bags are inserted into open-front display cartons, and eventually are grouped into larger stacks 13 which are carried to a cartoning machine (not shown) for insertion into the cartons.

Initially, the filled bags are arranged in the small stacks 12 in buckets 14 on a conveyor 15 at a receiving station (not shown) and are advanced intermittently by the conveyor (in the direction of the arrow 16 shown in FIGS. 2 and 8) to a discharge station 17 spaced along the path of the conveyor from the receiving station. The conveyor is in the form of an endless chain trained around a sprocket wheel 18 (FIGS. 1 and 2) fast on a shaft 19 journaled on a pair of parallel horizontal frame rails 20 mounted on vertical posts 21 upstanding from a base 22. A second shaft and sprocket wheel assembly (not shown) supports the chain near the ends of the rails adjacent the receiving station. The buckets, secured to the chain in evenly spaced relation by brackets 23, have a generally U-shaped configuration and open upwardly when on the upper run of the chain thereby to form pockets into which the small stacks are deposited. Between the receiving station and the discharge station, the stacks are held against sliding out of the open sides of the buckets by a pair of retaining plates 24 (FIGS. 2 and 3) extending along the upper run of the chain and welded to the rails 20.

To advance the stacks 12 step-by-step from the receiving station to the discharge station 17, a cycle shaft 25 (FIG. 1) drives an endless belt 26 through a Geneva mechanism 27 positioned on the base 22. The belt is tensioned between and trained around a first pulley 28 fast on one end of the conveyor shaft 19 and a second pulley 29 keyed to the output shaft 30 of the Geneva mechanism. In this instance, the cycle shaft 25 is suitably driven to turn through one revolution each time a small stack of bags is loaded into a bucket at the receiving station, and the Geneva mechanism is of the type in which the output shaft 30 rotates through a sufficient angle to advance the buckets one step during part of each revolution of the cycle shaft and then is idle during the remainder of the revolution. Accordingly, a loaded bucket is advanced to the discharge station as the cycle shaft starts through one revolution and then dwells at the discharge station as the cycle shaft continues through and completes the one revolution.

As each bucket 14 dwells at the discharge station 17, the small stack 12 therein is delivered by a transfer mechanism 31 to an operating device 32, and thereafter is transferred from the operating device into a loading station 33 (FIG. 8) spaced laterally from the conveyor 15 and the discharge station. At the loading station, the bags are grouped into the large stacks 13, herein of twenty-four bags each, on a cartoning conveyor 34 for subsequent conveyance to the cartoning machine. As shown in FIGS. 2 and 3, the cartoning conveyor includes a series of U-shaped, upright holders 35 formed with open upper and lower ends and having open sides facing the operating device. The holders are supported by brackets 36 on a pair of endless chains 37 and are advanced intermittently along a horizontal path into the loading station by a conventional drive mechanism (not shown).

In order to group the small stacks 12 into the large stacks 13 in each holder 35 dwelling in the loading station 33, an accumulator is positioned in the loading station on one side of the operating device 32 and beneath the holders. The accumulator may be similar to the one shown in Frank Patent 3,107,793 to which reference is made for specific details of construction and operation. Generally, an accumulator of this type includes an elevator platform 38 (FIGS. 2, 3, 7 and 9) which receives each small stack from the operating device and lifts the stack upwardly into a dwelling holder through the open lower end of the latter. When the first small stack has been loaded into the holder, a pair of horizontal retaining plates 39 on opposite sides of the elevator platform slide toward each other and beneath the stack (see FIG. 7) to hold it in its raised position, the elevator platform thereafter lowering into position to accept the second small stack transferred from the operating device. As the second stack is lifted upwardly, the retaining plates slide away from each other (see FIG. 9) to admit the second stack into the holder beneath the first stack which is pushed further up into the holder. Then, the plates move beneath and hold both stacks. When six small stacks have been grouped into a large stack, the cartoning conveyor 34 is advanced thereby stepping the loaded holder toward the cartoning machine and stepping an empty holder to the loading station.

To raise and lower the elevator platform 38, a cam 40 (FIG. 7) fast on the cycle shaft 25 engages a follower 41 journaled on a pivoted lever 42 to rock the latter upwardly and downwardly. The motion of the lever is transmitted by a pitman 43 to a car 44 which supports the elevator platform by means of a horizontal arm 45 and a vertical rod 46. The car is journaled for up and down sliding movement on a pair of vertical rods 47 suitably supported on a horizontal frame beam 48 mounted on standards 49 projecting upwardly from the base 22.

Projecting from the standards 49 toward the cartoning conveyor 34 are a pair of arms 50 (FIG. 2) supporting a horizontal guide bar 51 upon which the retaining plates 39 move toward and away from each other. As shown most clearly in FIGS. 2, 7 and 9, each plate upstands from a block 52 journaled for sliding horizontally along the guide bar with each block being connected by a link 53 to a clevis 54 on the upper end of a vertical push rod 55. The push rod moves downwardly and upwardly through a guide block 56 suitably fastened to one of the standards 49, and alternately closes and spreads the links 53 to move the blocks 52, and thus the plates 39, toward and away from each other. For reciprocating the push rod, a pitman 57 is connected between the lower end of the rod and one end of a pivoted lever 58 and is moved upwardly and downwardly as the lever is rocked vertically by a cam 59 keyed to the cycle shaft 25 and engaging a follower 60 journaled on the lever. The cams 40 and 59 are shaped in such a manner that the retaining plates are moved away from each other just as the top bag on the elevator platform 38 reaches the underside of the plates and then are moved toward each other shortly after the bottom bag has passed between the plates.

The stacks 12, as they are delivered by the transfer mechanism 31 from the operating device 32 to the elevator platform 38, pass through and interrupt a beam of light directed from a light source 61 (FIGS. 1 and 2) positioned above the frame beam 48 toward a photoelectric cell 62 thereby to register a count of one on a counter (not shown). When six small stacks have passed through the light beam and have been grouped into a large stack 13 in a holder 35 on the cartoning conveyor 34, the counter energizes the drive mechanism for the conveyor and the loaded holder is advanced toward the cartoning machine. A stationary track 63 (FIG. 2) disposed below the holders and partially supported by the arm 50 prevents the large stacks from falling out of the open lower ends of the holders as the conveyor is advanced.

The present invention contemplates a new and improved transfer mechanism 31 of relatively simple and inexpensive construction for delivering a stack of bags from the conveyor 15 to the operating device 32 and, after the stack has been arranged properly, for transferring the stack from the operating device to the loading station 33 as an incident to the delivery of the next stack of bags to the operating device from the conveyor. To these ends, the transfer mechanism includes a carrier 64 (FIG. 5) and a pusher 65 shiftable back and forth across the path of the conveyor for pushing the stacks from the discharge station 17 onto the operating device. Mounted on the carrier in advance of each new stack being delivered to the operating device is a gate 66 which shoves a previously delivered stack on the operating device to the loading station during the forward stroke of the carrier and then is moved and held in an inactive position in a novel manner during the following return stroke to pass by the stack newly delivered to the operating device. With this arrangement, one stack of bags is transferred to the operating device and another stack is delivered to the loading station upon a single forward stroke of the carrier 64.

In the present instance, the operating device 32 is a turn-around for rotating the delivered stacks end-for-end in a horizontal plane in order that the bags and the printed matter thereon will be positioned properly when subsequently cartoned. As shown in FIGS. 1 to 3, the turn-around includes a gearbox 67 bolted to a vertical post 68 on the base 22, and a receiving platform 69 fast on an upright shaft 70 journaled in the gearbox. The platform is positioned between the discharge station 17 and the loading station 33 and is formed with a bottom plate level both with the bottom of the buckets 14 dwelling in the discharge station and with the elevator platform 38. Housed within the gearbox is conventional miter gearing (not shown) which rotatively couples the upright shaft 70 with a horizontal input shaft 71, the latter being driven by a chain 72 trained around sprocket wheels 73 and 74 on the input shaft and on the end of the conveyor shaft 19 opposite the pulley 28. Preferably, the platform is rotated through one-half revolution each time the conveyor 15 is advanced.

The carrier 64 of the transfer mechanism 31 is suspended above the coveyor 15 at the discharge station 17 by hangers 75 (FIGS. 1 and 5) depending from a car 76 in the form of a slide block guided on parallel horizontal guide rods 77 for back and forth sliding movement along a path transverse to the conveyor. Supplying the rods are a pair of plates 78 disposed on opposite sides of the conveyor and connected by a cross-piece 79 which is mounted above the conveyor by brackets 80 (FIG. 1) upstanding from the rails 20. In order to shift the carrier back and forth across the conveyor, the slide 76 is moved along the rods by the cycle shaft 25. For this purpose, a link 81 (FIGS. 1 and 5) is pivotally connected at one end to the slide and at the other end to the upper end of an upright leg 82 of a bell crank 83 which is fast on a shaft 84 journaled to turn in bearings 85 suitably mounted on the posts 21. The other leg 86 of the bell crank is pivotally connected by a link 87 to the left-hand end of a lever 88 overlying the cycle shaft, the lever being pivotally mounted at its right-hand end on a fixed pin 89 located beyond the cycle shaft. An eccentric cam 90 fast on the cycle shaft engages a roller follower 91 journaled on the lever between the ends of the latter to rock the lever and the crank leg 86 upwardly while a compression spring 92 surrounding a rod 93 fulcrumed to the crank and slidably received in a bracket 94 on one of the posts rocks the lever and the crank leg 86 in a downward direction. Accordingly, the cam and the spring, acting through the lever and the crank, move the slide 76 and the carrier 64 back and forth across the conveyor 15.

As shown in FIGS. 1 and 5, the carrier 64 includes a pair of spaced frame bars 95 suspended cantilever fashion by the hangers 75 and positioned above the buckets 14. The pusher 65 for pushing the stacks 12 from the buckets to the receiving platform 69 is a vertical plate depending from the frame bars and bolted to the latter at 96. The gate 66 for pushing the stacks from the receiving platform to the loading station 33 is mounted on the free ends of the frame bars and preferably comprises a pair of vertical fingers 97 each clamped near its upper end to the forward face of an operator block 98 by a screw 99. Herein, the operator blocks are fulcrumed to turn about vertical axes defined by pivot members 100 which secure the blocks to the frame bars. Thus, depending upon the angular position of the blocks, the fingers may be disposed relatively close together as shown in FIGS. 2 and 5 or they may be spread apart as shown in FIG. 6.

Initially, the carrier 64 is disposed in the retracted position overlying the conveyor 15 (FIGS. 1 and 2) with the pusher plate 65 and the fingers 97 being spaced from each other on opposite sides of the conveyor. When the carrier is in this position, the fingers are held closed and urged toward each other by a tension spring 101 stretched between two pins 102 upstanding from the operator blocks 98. The opposing sides of the blocks engage opposite ends of the forward leg of a substantially H-shaped stop plate 103 bolted to the frame bars 95 to limit the rotation of the fingers toward each other. As the cycle shaft 25 starts through one revolution, the carrier remains stationary until the cycle shaft and the Geneva mechanism 27 have advanced a loaded bucket 14 to the discharge station. Then, the follower 91 meets a fall surface on the cam 90 and, as a consequence, the spring 91 shifts the carrier forwardly to the extended position overlying the receiving platform 69 of the turn-around 32 (see FIG. 3). During the forward stroke of the carrier, the pusher plate 65 engages a small stack 12 of bags in the dwelling bucket and pushes the stack through an opening cut in the retaining plate 24, across a stationary approach platform 104 secured to the retaining plate alongside the conveyor, and onto the receiving platform of the turn-around.

As the carrier 64 approaches the extended position, a pair of vertical operator lugs 105 projecting upwardly from the operator blocks 98 engage abutment surfaces which herein are the inclined heads of bolts 106 (FIGS. 2, 3 and 6) secured to an arm 107 mounted on the frame beam 48 in the loading station 33. Engagement of the lugs with the bolt heads, in conjunction with the continued forward movement of the carrier, causes the operator blocks to turn about the pivot members 100 thereby spreading the fingers to the open or inactive position shown in FIG. 6. As the blocks rotate, the pins 102 cross over an imaginary line through the two pivot members so that the longitudinal axis of the spring 101 passes "over center" thus reversing the effective direction of the spring force on the blocks. Accordingly, the spring then urges the fingers toward the open position in which the rear surfaces of the blocks engage stop surfaces formed on the rear leg of the plate 103 to limit further spreading of the fingers.

As the carrier 64 reaches the end of its forward stroke and after the fingers 97 have been spread, the follower 91 encounters a rise on the rotating cam 90 and, through the lever 88 and the bell crank 83, shifts the carrier in the opposite direction back toward the discharge station 17. The fingers 97, being spread apart a distance greater than the width of the first stack 12 which was delivered to the receiving platform 69, pass by the sides of the first stack during the return stroke of the carrier and leave that stack resting on the receiving platform. As the carrier returns to the discharge station, the lugs 105 abut the end surfaces of bolts 108 (FIG. 2) threaded in supporting members 109 projecting upwardly from the forward rail 20 to rotate the blocks 98 and thus the fingers 97, back to the closed position. Concurrently, the spring 101 passes over center and reverses to retain the fingers in the closed position. The cycle shaft 25 then completes the one revolution and starts through another revolution.

During the initial portion of the second revolution of the cycle shaft 25, the conveyor 15 again is advanced to step another loaded bucket 14 to the discharge station 17 and, since the turn-around 32 is driven by the conveyor through the chain 72, the receiving platform 69 simultaneously is rotated through a 180 degree arc thereby turning the first stack on the platform end-for-end. Then, as the carrier again extends and the pusher plate 65 pushes a second stack from the bucket onto the receiving platform, the closed fingers 97 engage the first stack resting on the platform and shove the first stack onto the elevator platform 38 for loading into a dwelling holder 35 on the cartoning conveyor 34. The operation thereafter is continuous with successive stacks of bags being delivered from the conveyor 15 to the receiving platform, and the preceding stacks being transferred from the receiving platform to the elevator platform upon each forward stroke of the carrier 64.

From the foregoing it is apparent that the gate 66 of the novel transfer mechanism 31 is movable between open and closed positions to deliver a stack of bags from the turn-around 32 into the loading station 33 during the forward stroke of the carrier 64 and to pass by a stack of bags on the turn-around during the following return stroke. Since the back and forth motion of the carrier and the abutment surfaces 106 and 108 are utilized for moving the gate between the open and closed positions, the transfer mechanism is of relatively simple and inexpensive construction and does not require complex mechanical, electrical or hydraulic controls.

We claim as our invention:

1. In a packaging machine for handling a series of packages, the combination of, a first conveyor for supporting and advancing the packages along a predetermined path to a discharge station, a second conveyor having a loading station on one side of said path, a rotary turning device having a platform disposed between said two stations and operable to turn a package delivered to the platform through a preselected arc, a package carrier movable back and forth across said path between a retracted position overlying said discharge station and an extended position overlying said platform, a pusher on said carrier positioned on the other side of said path when the carrier is in said retracted position to engage a package in said discharge station and shift the package laterally along a second path onto said platform as the carrier moves from the retracted position to said extended position, mechanism for moving said carrier back and forth between said retracted and extended positions in timed relation with the advance of the packages along said predetermined path thereby to shift successive packages from said discharge station to said platform, package engaging fingers on said carrier and disposed on said one side of said predetermined path when the carrier is in said retracted position thereby to move in advance of each package as the carrier moves toward said extended position, operators mounting each of said fingers on said carrier for movement between an active position in said second path and an inactive position out of said second path, over-center spring means connected to said fingers for yieldably retaining said fingers both in said active and in said inactive positions, first abutment surfaces in said loading station and positioned to engage said operators as said carrier moves into said extended position thereby to move said fingers to said inactive position, and second abutment surfaces in said discharge station and positioned to engage said operators as said carrier returns to said retracted position thereby to return said fingers to said active position whereby the fingers push a package from said platform during each forward stroke of said carrier and by-pass the next package on the platform during the following return stroke.

2. In a machine for handling a series of articles to be packaged, the combination of, a conveyor for supporting and advancing the articles step-by-step along a predetermined path to a discharge station, a loading station spaced laterally from said discharge station, an operating device having a receiver positioned between said two stations to receive articles from said conveyor, said operating device including mechanism for rotating said receiver intermittently in timed relation with the advance of the articles along said path thereby to turn said receiver and the articles delivered thereto through a preselected arc, a carrier movable back and forth across said path between a retracted position overlying said discharge station and an extended position overlying said receiver, a pusher on said carrier positioned on one side of said path when the carrier is in said retracted position to engage an article in said discharge station and shift the article laterally along a second path onto said receiver as the carrier moves from the retracted position to said extended position, mechanism for moving said carrier back and forth between said positions in timed relation with the advance of the articles along said predetermined path to shift successive articles from said discharge station onto said receiver, a gate on said carrier disposed on the other side of said predetermined path when the carrier is in said retracted position thereby to move in advance of each article as the carrier moves toward said extended position, operator means mounting said gate on said carrier for movement between an active position in said second path and an inactive position out of said second path, first abutment means positioned to engage said operator means as said carrier moves into said extended position and moving said gate to said inactive position whereby the latter passes by an article on said receiver as said carrier returns to said retracted position, and second abutment means positioned to engage said operator means as said carrier returns to said retracted position and moving said gate to said active position whereby the latter is positioned to push an article on said receiver into said loading station as an incident to the delivery of the next article to the receiver by said pusher.

3. A machine as defined in claim 2 in which said pusher and said gate depend from said carrier and are spaced laterally from each other a distance greater than the width of said predetermined path.

4. A machine as defined in claim 2 in which said operator means comprise a pair of blocks spaced apart on said carrier laterally of said second path, and said gate comprises fingers secured to and depending from said blocks.

5. A machine as defined in claim 4 further including pivot members pivoting said blocks to said carrier for turning movement of said fingers between said active and inactive positions, a spring extending between said blocks, said spring being disposed on one side of said pivot members and urging said blocks to turn in one direction when said fingers are in said active position and being disposed on the opposite side of said pivot members and urging said blocks to turn in the opposite direction when said fingers are in said inactive position.

6. In a packaging machine for handling a series of articles to be packaged, the combination of, a frame, means on said frame for supporting the series of articles and advancing the articles step-by-step along a predetermined path to a discharge station, an operating device having a receiver positioned beside said path at said discharge station to receive articles from said supporting means, said operating device including mechanism for rotating said receiver intermittently in timed relation with the advance of the articles along said path thereby to turn said receiver and the articles delivered thereto through a preselected arc, transfer mechanism supported on said frame adjacent said discharge station and including a carrier movable back and forth between a retracted position overlying said discharge station and an extended position overlying said receiver, a pusher on said carrier positioned on one side of said path when the carrier is in said retracted position to engage an article in said discharge station and shift the article along a second path onto said receiver as the carrier moves from the retracted position to said extended position, a gate on said carrier disposed on the other side of said predetermined path when the carrier is in said retracted position thereby to move in advance of each article as the carrier moves toward said extended position, mechanism for moving said carrier back and forth between said positions in timed relation with the advance of the articles along said predetermined path to shift successive articles from said discharge station onto said receiver, said gate being mounted on said carrier for movement between an active position in said second path and an inactive position out of said second path, and means operable as an incident to the back and forth movement of said carrier for positioning said gate in said active position as the carrier moves toward said extended position and in said inactive position as the carrier returns to said retracted position whereby the gate pushes an article from said receiver during each forward stroke of said carrier and by-passes the next article on the receiver during the following return stroke.

7. In a mechanism for transferring packages, the combination of, a frame, a carrier movable back and forth on said frame between first and second positions, a pusher depending from said carrier for shifting a package along a predetermined path as the carrier moves from said first position toward said second position, a gate comprising a pair of fingers depending from said carrier and spaced from said pusher to move in advance of the package as the latter is shifted along said path, a pair of blocks pivoted on said carrier and mounting said fingers for turning about vertical axes between an active position in said path and an inactive position out of said path, a tension spring connected between said blocks and extending laterally of said path for retaining said fingers in said active and inactive positions, the longitudinal axis of said spring being disposed on one side of an imaginary line extending between said vertical axes when said fingers are in said active position and being disposed on the other side of said line when the fingers are in said inactive position, and means operable as an incident to the back and forth movement of said carrier for positioning said fingers in said active position as the carrier moves toward the second position and for positioning the fingers in said inactive position as the carrier returns to the first position whereby the fingers pass by the shifted package during the return stroke of the carrier and then push the package along a continuation of said path during the next forward stroke.

8. In a mechanism for transferring articles, the combination of, a frame, a carrier movable back and forth on said frame between first and second positions, a pusher depending from said carrier for shifting an article along a predetermined path as the carrier moves from said first position toward said second position, a gate comprising a pair of spaced apart members spaced from said pusher to move in advance of the article and pivoted on the carrier for turning about upright axes between active positions disposed in said path and inactive positions spaced from said path, the spacing between said members being less than the corresponding dimension of the article when said members are in said active positions, said members turning in opposite directions about said axes when moved to said inactive positions thereby to increase the spacing between the members to a distance greater than the corresponding dimension of the article, and means operable as an incident to the back and forth movement of said carrier for turning said members to said active positions as the carrier moves in one direction and for turning said members to said inactive positions as the carrier moves in the opposite direction whereby the members pass by the shifted article during the return stroke of the carrier and then push the article along a continuation of said path during the next forward stroke.

9. A mechanism as defined in claim 8 further including an operator on each of said members and projecting radially from said axes, said means comprising a first set of abutments fixed to said frame for engaging the sides of said operators at the end of the forward stroke of said carrier thereby to turn said members to said inactive positions, and a second set of abutments fixed to said frame for engaging the opposite sides of said operators at the end of the return stroke of said carrier thereby to turn said members to said active positions.

10. A mechanism as defined in claim 8 further including an over-center spring acting on said members and passing back and forth across center as said members are turned between said active and inactive positions thereby to hold the members yieldably in each of their turned positions.

References Cited

UNITED STATES PATENTS

| | | | |
|---|---|---|---|
| 3,213,999 | 10/1965 | Williams | 198—24 |
| 3,217,858 | 11/1965 | Fellner et al. | 198—24 X |
| 3,266,622 | 8/1966 | Zimmerman | 198—224 |

FOREIGN PATENTS

| | | |
|---|---|---|
| 84,111 | 3/1895 | Germany. |

EVON C. BLUNK, *Primary Examiner.*

A. C. HODGSON, *Assistant Examiner.*